United States Patent Office 3,306,911
Patented Feb. 28, 1967

3,306,911
METHOD FOR PREPARING THIOLACTAMS
Richard C. Doss, Bartlesville, Okla., assignor to Phillips Petroleum Company, a corporation of Delaware
No Drawing. Filed Aug. 30, 1965, Ser. No. 483,777
6 Claims. (Cl. 260—326.83)

This invention relates to a method for preparing thiolactams.

Heretofore it was believed that in reacting elemental sulfur with a compound that contained a carbonyl group having an adjacent methylene group, the sulfur would react with the methylene group and not the carbonyl group in forming a thio compound, see Asinger, Angew. Chem., 68, 413 (1956).

Quite surprisingly, it has now been found that in the reaction of elemental sulfur with a lactam, the sulfur replaces the oxygen atom of the carbonyl group in forming the thiolactam.

Accordingly, it is an object of this invention to provide a new and improved method for making thiolactams.

Other aspects, objects and the several advantages of this invention will be readily apparent to those skilled in the art from the description and the appended claims.

According to this invention, the thio compound is prepared by reacting a lactam with elemental sulfur at an elevated temperature.

The lactams employed in this invention are represented by the formula:

(1) 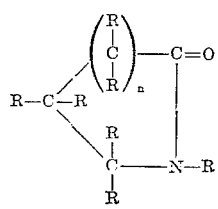

wherein each R is selected from the group consisting of hydrogen, alkyl and cycloalkyl (preferably hydrogen and alkyl) radicals, said radicals being alike or different in the lactam. The hydrocarbon radicals can be saturated aliphatic or saturated cycloaliphatic radicals and combinations thereof containing from 1 to 6 carbon atoms, inclusive. The term $n$ in the above formula can be an integer from 0 to 10, inclusive. The total number of carbon atoms in the lactams employed generally should not exceed 20.

The thiolactams which are prepared by this invention are represented by the formula:

(2) 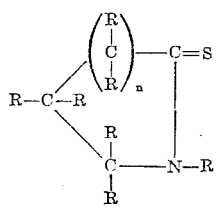

Examples of lactams which are converted to thiolactams by this invention include 2-azetidinone, 2-pyrrolidinone, 2-piperidone, 2-oxohexamethylenimine (caprolactam), 1-methyl-2-azetidinone, 1-methyl-2-pyrrolidinone, 2-oxo-1-ethylhexamethylenimine, 3,3-di-n-propyl-2-piperidone, 2-oxo-4-n-hexylhexamethylenimine, 2-oxo-1-cyclopentylhexamethylenimine, lactam of 7 - (cyclohexylamino)-heptanoic acid, lactam of 13-aminotridecanoic acid, 3,4,5-tri-n-pentyl-2-piperidone, 3-cyclopentyl-2-pyrrolidinone, lactam of 8-amino-3-cyclohexyl-4-ethyloctanoic acid, 1-isopropyl-2-pyrrolidinone, and 2-oxo-1-ethyl-3-tert-butylhexamethylenimine.

According to this invention elemental sulfur is reacted with at least one of the lactams of Formula 1 at an elevated temperature which can vary widely but will generally be within the range of from about 150 to about 400, preferably from about 200 to about 300° C., for a time period of from about 3 minutes to about 12 hours, preferably from about 30 minutes to about 6 hours. The reaction pressure can also vary widely; for example, the reaction can be carried out in a closed vessel under autogenuous pressure. However, lower or higher pressures, e.g. from atmospheric pressure up to 5000 p.s.i.g. or more, can be employed.

The amount of sulfur relative to the lactam in the process can also vary widely but will generally be in the range of from about 0.1 to about 10, preferably from about 0.2 to about 5, gram atoms of sulfur per mol of lactam.

Upon completion of the reaction, the thiolactam can readily be separated from the reaction mixture by conventional processes such as distillation, solvent extraction, chromatography, crystallization, and the like.

In the process of this invention, the lactam can be employed in the liquid or gaseous phase. The lactam can serve as the solvent, or an additional solvent or diluent can be employed. Examples of suitable additional solvents are aromatic hydrocarbons such as benzene, toluene, xylenes, and the like; saturated aliphatic hydrocarbons such as pentane, hexane, octane, and the like; saturated cycloaliphatic hydrocarbons such as cyclohexane, methylcyclopentane, and the like; and ethers such as diethyl ether, di-n-butyl ether, tetrahydrofuran, dioxane, and the like. The reaction can be carried out in a continuous or batch process.

EXAMPLE

A mixture of 215 grams (2 mols) of 1-methyl-2-pyrrolidinone and 40 grams (1.2 gram atoms) of sulfur was heated in a stirred autoclave at 250° C. and from 550 to 600 p.s.i.g. for 4 hours. The reactor was then vented and the reaction mixture distilled to produce 175.4 grams of distillate boiling over the range of from about 50 to 102° C. at 0.2 millimeter pressure. The undistilled residue remaining weighed 45.6 grams. Gas chromatographic analysis of the distillate indicated its composition to be 87.3 weight percent 1-methyl-2-pyrrolidinone, 10.1 weight percent 1-methyl-2-pyrrolidinethione, and 2.6 weight percent of other, unidentified materials. The yield of 1-methyl-2-pyrrolidinethione was 12.5 mol percent based on the sulfur originally charged to the autoclave.

The 1-methyl-2-pyrrolidinethione was identified by gas chromatography techniques utilizing an authentic specimen for comparative purposes, which specimen was obtained and identified by the following experiment:

A mixture of 215 g. (2.0 moles) of 1-methyl-2-pyrrolidinone, 20 g. (0.62 g.-atom) of sulfur, and 40 g. (0.755 mole) of acrylonitrile was heated at 250° C. and approximately 90 p.s.i.g. for 4 hours. From the reaction mixture was obtained a liquid distilling at 63° C./0.05 mm., $n_D^{20}$ 1.5782, identified as 1-methyl-2-pyrrolidinethione by elemental analysis and molecular weight determination, as shown below, and by comparison of its infrared spectrum and refractive index with those of an authentic specimen of 1-methyl-2-pyrrolidinethione.

Elemental analysis (weight percent based on total weight of material) and molecular weight determination data: Calculated for 1 - methyl - 2 - pyrrolidinethione ($C_5H_9NS$): C, 52.1; H, 7.9; N, 12.1; S, 27.8; mol. wt., 115.2. Found: C, 51.9; H, 8.2; N, 12.0; S, 27.0; mol. wt., 120.

Reasonable variations and modifications are possible within the scope of this disclosure without departing from the spirit and scope thereof.

I claim:
1. A method for producing a thiolactam comprising reacting at elevated temperatures, elemental sulfur with a lactam represented by the formula

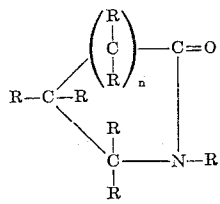

wherein each R is selected from the group consisting of hydrogen, alkyl and cycloalkyl containing from 1 to 6 carbon atoms, inclusive, wherein $n$ is a whole integer from 0 to 10, inclusive, and wherein the total number of carbon atoms in said lactam does not exceed 20.

2. The method according to claim 1 wherein said elemental sulfur is employed in the amount of from about 0.1 to about 10 gram atoms of sulfur per mol of lactam.

3. The method according to claim 1 wherein the reaction is carried out at a temperature of at least 150° C. and a pressure of at least about atmospheric.

4. The method according to claim 1 wherein the temperature of reaction is in the range of from about 150 to about 400° C. and the elemental sulfur is present in the amount of from about 0.1 to about 10 gram atoms of sulfur per mol of lactam.

5. A method for making a thiolactam comprising reacting 1-methyl-2-pyrrolidinone with an effective amount of elemental sulfur and at an elevated temperature and pressure both sufficient to produce the desired thiolactam.

6. The method according to claim 5 wherein the amount of elemental sulfur employed is in the range of from about 0.1 to about 10 gram atoms of sulfur per mol of 1-methyl-2-pyrrolidinone.

References Cited by the Examiner
UNITED STATES PATENTS 2,265,212  12/1941  Westphal et al. ____ 260—293.4
3,192,210  6/1965  Lunsford et al. ____ 260—326.83

OTHER REFERENCES

The Merck Index, 7th Ed., Merck and Co., Inc., Rahway, 1960 pages 536 and 811.

ALEX MAZEL, *Primary Examiner.*

MARY U. O'BRIEN, *Assistant Examiner.*